(12) United States Patent
Avila

(10) Patent No.: US 6,231,475 B1
(45) Date of Patent: May 15, 2001

(54) UNIDIRECTIONAL BALL CLUTCH

(75) Inventor: Miguel I. Avila, Chihuahua (MX)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/483,097

(22) Filed: Jan. 14, 2000

(51) Int. Cl.$^7$ ................................................ B60K 41/20
(52) U.S. Cl. .................................................. 477/96
(58) Field of Search .................. 477/99, 96; 192/220.2, 192/220.4, 220.5, 222

(56) References Cited

U.S. PATENT DOCUMENTS 4,966,262 * 10/1990 Mieczkowski .................... 192/220.2

* cited by examiner

Primary Examiner—Dirk Wright
(74) Attorney, Agent, or Firm—Margaret A. Dobrowitsky

(57) ABSTRACT

An unidirectional ball clutch (100) includes a locking collar (102), a bearing support collar (120), and a coil assembly (132) all disposed on a shaft (110). stablished between the locking collar (102) and the bearing support collar (120) is a bearing channel (127). Preferably, the bearing channel (127) is formed with a constant width portion (129) that leads to a decreasing width portion (131). At least one ball bearing (126) is disposed within the bearing channel (127) between the locking collar (102) and the bearing support collar (120). When the coil assembly (132) is energized, the bearing support collar (120) is magnetically coupled to the coil assembly (132). Accordingly, if the locking collar (102) is rotated in one direction relative to the bearing support collar (120) the bearing wedges itself in the decreasing width portion (131) of the bearing channel (127) and prevents any relative torsional motion between the locking collar (102) and the bearing support collar (120). However, the locking collar (102) may rotate in the opposite direction with respect to the bearing support collar (120). When the brakes are applied, the power flow to the coil assembly (132) is interrupted, releasing the support collar (120) such that the locking collar (102) can move torsionally in either direction with respect to the bearing support collar (120). The ball clutch (100) therefore prevents an automatic transmission (164) from being shifted out of park unless the brake pedal (160) is depressed.

4 Claims, 1 Drawing Sheet

UNIDIRECTIONAL BALL CLUTCH

TECHNICAL FIELD

The present invention relates to electro-mechanical locking mechanisms for motor vehicle transmissions.

BACKGROUND OF THE INVENTION

Many vehicles available today are equipped with a safety mechanism that prevents an automatic transmission from being shifted into gear unless the driver is pressing the brake pedal. This safety feature prevents a vehicle from inadvertently being shifted into gear when the driver is out of the vehicle or when he or she is not yet ready to move.

Current state of the art transmission locks include devices such as ratchet-type mechanisms and locking-pin mechanisms. The present invention recognizes that these alternative transmission locks include numerous parts and components that increase manufacturing time and production costs. Moreover, because of the amount of moving parts included in these alternative transmission locks, they tend to rattle while the vehicle is in motion, and thus increase noise in the driver/passenger compartment.

The present invention has recognized these prior art drawbacks, and has provided the below-disclosed solutions to one or more of the prior art deficiencies.

SUMMARY OF THE INVENTION

A unidirectional ball clutch assembly for use in a vehicle transmission locking system includes a locking collar and a bearing support collar that is sized to be at least partially received in the locking collar. A bearing channel is established between the locking collar and the bearing support collar, and at least one ball bearing is disposed within the bearing channel. The bearing channel is configured to cause the ball bearing to prevent the locking collar from rotating with respect to the bearing support collar in a first direction.

In a preferred embodiment, the bearing channel is established between a cam surface that is defined by the locking collar and an outer surface that is defined by the bearing support collar. The bearing channel also includes a constant width portion and a variable width portion. Preferably, the locking collar forms a bore, the bearing support collar forms a bore, and the locking collar and the bearing support collar are disposed on a shaft sized to be received within both bores.

Also in a preferred embodiment, the clutch assembly includes a coil assembly adjacent to the bearing support collar. The coil assembly is capable of being energized to prevent any relative motion between the bearing support collar and the coil assembly, and the coil assembly includes at least one frame disposed around the shaft and a coil in a surrounding relationship with the frame. Moreover, the bearing support collar forms a bearing retainer flange to keep the bearing within the bearing channel. The bearing retainer flange is magnetically coupled to the coil assembly when the coil is energized to prevent the bearing support collar from moving relative to the coil assembly. Preferably, a coil housing surrounds the coil and the frame, and a connecting rod extends from the locking collar. The connecting rod is mechanically coupled to a transmission control linkage that in turn is mechanically coupled to an automatic transmission.

In another aspect of the present invention, a unidirectional ball clutch includes at least one bearing channel established between two concentric collars. The bearing channel has a constant width portion leading to a variable width portion, and at least one bearing is disposed within the bearing channel. The bearing cooperates with both portions to prevent rotational motion between the two concentric collars in a first direction, and to permit rotational motion between the collars in a second direction.

In yet another aspect of the present invention, an electro-mechanical transmission locking system includes a vehicle power supply, an ignition switch electrically coupled to the vehicle power supply, a brake pedal, a ball clutch electrically coupled to the ignition switch and the brake pedal, and an automatic transmission mechanically coupled to the ball clutch.

The present invention will now be described, by way of example, with reference to the accompanying drawings, in which:

DESCRIPTION OF AN EMBODIMENT OF THE INVENTION

Figure 1:
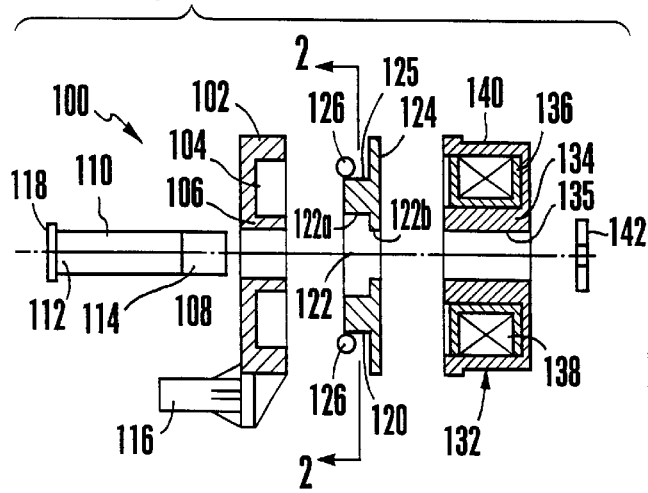
FIG. 1 is an exploded cross-sectional view of the unidirectional ball clutch.

Referring initially to FIG. 1, a unidirectional ball clutch is shown and generally designated 100. FIG. 1 shows that the unidirectional ball clutch 100 includes a plastic, or more preferably metal, generally cylindrical locking collar 102 that forms an internal channel 104 around a central hub 106. FIG. 1 shows that the central hub 106 forms a central bore 108 that is sized to receive a retaining shaft 110 having a proximal end 112 and a distal end 114. Moreover, a shift lever connecting rod 116 is connected to the outer edge of the locking collar 102, although the connecting rod 116 may be integrally formed with the collar 102. When placed over the retaining shaft 110, the locking collar 102 abuts an end cap 118 integrally formed on the proximal end 112 of the shaft 110.

Figure 2:
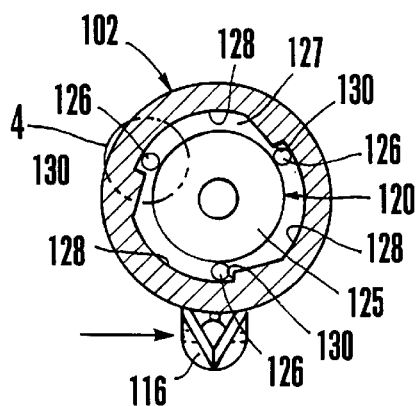
FIG. 2 is an overhead cross-sectional view showing how the unidirectional ball clutch locks in the counterclockwise direction.
Figure 3:
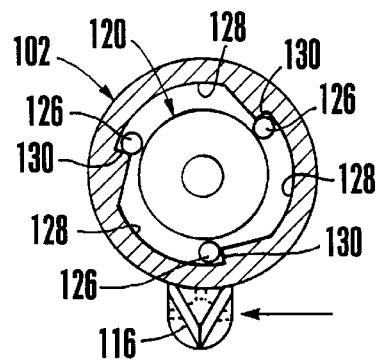
FIG. 3 is an overhead cross-sectional view showing how the unidirectional ball clutch freely moves in the clockwise direction.

FIG. 1 also shows a preferably metal, generally disk-shaped bearing support collar 120 that forms a central bore 122. A wide portion 122a of the central bore 122 is sized to fit over the central hub 106 of the locking collar 102. Also, a narrow portion 122b of the central bore 122 receives the retaining shaft 110. A bearing retainer flange 124 extends radially outward from the bearing support collar 120. Accordingly, the flange 124 caps the internal channel 104 when the bearing support collar 120 is installed over the central hub 106. Additionally, the bearing support collar 120 has an outer surface 125 having a cylindrical contour (circular in cross-section, as shown in FIGS. 2 and 3 discussed below). The diameter of the outer surface 125 is such that the bearing support collar 120 partially fills the internal channel 104 when it is installed over the central hub 106.

Referring now to FIGS. 2 and 3, three preferably metal ball bearings 126 are disposed within the internal channel 104 between the locking collar 102 and the bearing support collar 120. FIGS. 2 and 3 show that when bearing support collar 120 is disposed within the locking collar 102 it partially fills the internal channel 104 and establishes a bearing channel 127 having three identical cam surfaces 128. Each cam surface 128 extends radially inwardly along its length. Each cam surface 128 can be straight or curved, i.e., can be formed with a partially spiral contour. The cam surfaces 128 are equally spaced around the internal channel 104. Moreover, the locking collar 102 forms three cam faces 130 that are radially aligned with the center of the retaining shaft 110. Accordingly, the cam faces 130 extend into the internal channel 104 to separate each cam surface 128 and keep each bearing 126 in a respective portion of the internal channel 104.

Figure 4:
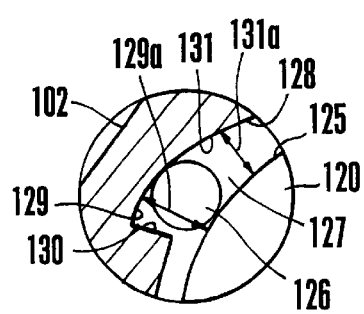
FIG. 4 is a detail view as seen as indicated by the circle 4 in FIG. 2.

Referring to FIG. 4, the details of the internal channel 104 can be seen. As shown, each portion of the bearing channel 127 has a constant width 129 portion and a varying width portion 131 established between an individual cam surface 128 and the outer surface 125 of the bearing support collar 120. More specifically, the constant width portion 129 has a constant width 129a for a distance within the channel 127 approximately equal to the diameter of the bearing 126 disposed within. However, at the end of the constant width portion 129 of the bearing channel 127, the varying width portion 131 starts. As shown, the varying width portion 131 decreases slightly in width 131a immediately adjacent to the constant width portion 129 and continues to decrease in width 131a toward, but not necessarily all the way to, the next cam face 130.

Referring back to FIG. 1 and moving to the right side of FIG. 1 to complete the physical description of the ball clutch 100, a coil assembly 132 is placed over the distal end 114 of the retaining shaft 110 adjacent to the bearing support collar 120. FIG. 1 shows that the coil assembly 132 includes a preferably metal frame 134 formed with a central bore 135. The frame 134 surrounds the shaft 110 and an l-shaped liner 136 is disposed around the frame 134. A toroidal coil 138 is received in the liner 136 and a hollow, generally cylindrical coil housing 140 surrounds and protects the coil 138. The housing 140 can be made integrally with the frame 134.

Still referring to FIG. 1, a spring clip 142 is installed over the distal end 114 of the retaining shaft 110 to hold the locking collar 102, the bearing support collar 120, and the coil assembly properly in place on the retaining shaft 110.

Figure 5:
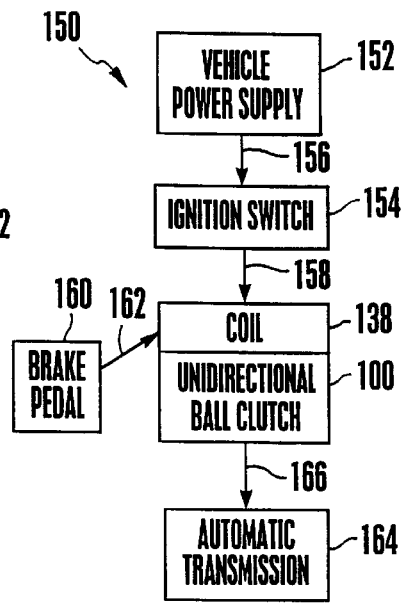
FIG. 5 is a block diagram representing a typical electro-mechanical transmission locking system.

Referring now to FIG. 5, an electro-mechanical transmission locking system is shown and generally designated 150 which incorporates the ball clutch 100 of the present invention. FIG. 5 shows that the locking system 150 includes a vehicle power supply 152 electrically coupled to an ignition switch 154 via an electrical line 156. The ball clutch 100, more specifically the coil 138, is electrically coupled to the ignition switch 154 via an electrical line 158 and to a brake pedal 160 via an electrical line 162. FIG. 5 also shows that the ball clutch 100 is mechanically coupled to an automatic transmission 164 via a transmission control linkage 166 that, in turn, is mechanically coupled to the shift lever connecting rod 116.

OPERATION

Referring to FIGS. 1 through 5 collectively, when the ignition switch 154 is in the on position and the vehicle is park, power is supplied to the ball clutch 100. Accordingly, the coil 138 is energized. With the coil 138 energized, the flange 124 is held tightly against the coil assembly 132 by the force of magnetic attraction therebetween. In other words, with the coil 138 energized the bearing collar 120 cannot rotate.

Accordingly, if the driver of the vehicle attempts to shift the automatic transmission 164 into gear, each ball bearing 126 will wedge in the variable width portion 131 of the bearing channel 127 between the cam surface 128 and the outer surface 125 of the bearing support collar 120, as shown in FIG. 2. This prevents the locking collar 102 from rotating in the counterclockwise direction, looking down on FIG. 2. However, with the coil 138 still energized, if the locking collar is rotated in the clockwise direction, looking down in FIG. 3, each ball bearing 126 will rest against its respective cam face 130. Each bearing 126 will remain in the constant width portion 129 of the bearing channel 127, as shown in FIG. 3, thus allowing the locking collar 102 to rotate in the clockwise direction.

When the brake 160 is depressed, the power supply to the coil 138 is interrupted, releasing the bearing support collar 120 from the coil assembly 132 and allowing it to rotate freely with the locking collar 102. This allows the automatic transmission 164 to be shifted into gear.

With the configuration of structure described above, it is to be appreciated that unidirectional ball clutch can prevent the automatic transmission 164 from being placed into gear from park unless the driver depresses the brake pedal 160. On the other hand, the driver will be able to shift the automatic transmission 164 from any other gear into park without depressing the brake pedal 160.

While the particular unidirectional ball clutch as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. An electro-mechanical transmission locking system, comprising:
   a vehicle power supply;
   an ignition switch electrically coupled to the vehicle power supply;
   a brake pedal;
   a ball clutch electrically coupled to the ignition switch and the brake pedal; and
   an automatic transmission mechanically coupled to the ball clutch.

2. The system of claim 1, wherein the ball clutch comprises:
   a locking collar;
   a bearing support collar sized to be at least partially received in the locking collar;
   a bearing channel established between the locking collar and the bearing support collar; and
   at least one ball bearing disposed within the bearing channel.

3. The system of claim 2, wherein the bearing channel is established between a cam surface defined by the locking collar and an outer surface defined by the bearing support collar, the bearing channel further comprising:
   a constant width portion which allows the bearing to roll freely in one direction to allow relative rotational motion between the locking collar and the bearing support collar; and
   a variable width portion which allows the bearing to become wedged between the cam surface and the outer surface to prevent relative rotational motion between the locking collar and the bearing support collar.

4. The system of claim 3, wherein the ball clutch further comprises:
   a coil assembly adjacent to the bearing support collar, the coil assembly capable of being energized to prevent any relative torsional motion between the bearing support collar and the coil assembly.

* * * * *